US011043371B2

(12) United States Patent
Ueda et al.

(10) Patent No.: US 11,043,371 B2
(45) **Date of Patent: *Jun. 22, 2021**

(54) MASS SPECTROMETER

(71) Applicant: SHIMADZU CORPORATION, Kyoto (JP)

(72) Inventors: Manabu Ueda, Kyoto (JP); Kota Nagasao, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/771,396

(22) PCT Filed: Feb. 7, 2018

(86) PCT No.: PCT/JP2018/004159

§ 371 (c)(1),
(2) Date: Jun. 10, 2020

(87) PCT Pub. No.: WO2019/155542

PCT Pub. Date: Aug. 15, 2019

(65) Prior Publication Data

US 2020/0395206 A1 Dec. 17, 2020

(51) Int. Cl.
*H01J 49/06* (2006.01)
*H01J 49/24* (2006.01)
(Continued)

(52) U.S. Cl.
CPC ........ *H01J 49/4215* (2013.01); *H01J 49/067* (2013.01); *H01J 49/24* (2013.01);
(Continued)

(58) Field of Classification Search
CPC ...... H01J 49/4215; H01J 49/067; H01J 49/24; H01J 49/4225; C25D 11/14
See application file for complete search history.

(56) References Cited

U.S. PATENT DOCUMENTS 4,032,782 A * 6/1977 Smith ................. H01J 49/4215 250/292
4,870,283 A * 9/1989 Taya ....................... H01J 37/12 250/396 R (Continued)

FOREIGN PATENT DOCUMENTS

DE 694 02 513 T2 12/1997
EP 0 655 771 A1 5/1995

(Continued)

OTHER PUBLICATIONS

U.S. Appl. No. 16/771,397, filed Jun. 10, 2020.

(Continued)

*Primary Examiner* — Sean M Luck
(74) *Attorney, Agent, or Firm* — Sughrue Mion, PLLC

(57) ABSTRACT

Four rod electrodes (50*a* to 50*d*) for separating ions according to a mass-to-charge ratio are held by two rod holders (51). The rod holders (51) are attached to metal holder sustaining stands (52) provided on a bottom surface of a vacuum housing (1). A coating film layer (10) is formed by a black nickel plating process on parts of wall surfaces in the vacuum housing (1), an inlet lens (4), and an outlet lens (6), the parts facing a quadrupole mass filter unit (5). The emissivity of the coating film layer (10) is higher than that of Al or the like, and thus radiant heat from the quadrupole mass filter unit (5) is efficiently absorbed by the coating film layer (10). Therefore, heat generated in the rod holders (51) due to dielectric loss is efficiently dissipated, and deformation of the rod holders can be reduced.

14 Claims, 4 Drawing Sheets

(51) Int. Cl.

| | |
|---|---|
| ***H01J 49/42*** | (2006.01) |
| *C25D 3/12* | (2006.01) |
| *C25D 11/14* | (2006.01) |

(52) U.S. Cl.

CPC ............ *H01J 49/4225* (2013.01); *C25D 3/12* (2013.01); *C25D 11/14* (2013.01)

(56) References Cited

U.S. PATENT DOCUMENTS

| | | | | |
|---|---|---|---|---|
| 5,459,315 | A | 10/1995 | Waki | |
| 5,525,084 | A | 6/1996 | Broadbent et al. | |
| 6,926,783 | B2 * | 8/2005 | Loucks, Jr. | H01J 9/14 156/294 |
| 7,348,552 | B2 * | 3/2008 | Laser | H01J 49/068 250/281 |
| 7,351,963 | B2 * | 4/2008 | Rebettge | H01J 9/14 250/292 |
| 8,395,112 | B1 * | 3/2013 | Bier | H01J 49/422 250/281 |
| 8,492,713 | B2 * | 7/2013 | Steiner | H01J 49/068 250/290 |
| 2003/0111598 | A1 * | 6/2003 | Gourley | H01J 49/162 250/288 |
| 2009/0250608 | A1 * | 10/2009 | Mordehai | H01J 49/167 250/288 |
| 2010/0301210 | A1 * | 12/2010 | Bertsch | G21K 1/093 250/290 |
| 2011/0016700 | A1 * | 1/2011 | Egley | H01J 49/422 29/592.1 |
| 2017/0097321 | A1 * | 4/2017 | Wu | G01N 27/622 |
| 2017/0365454 | A1 * | 12/2017 | Wu | H01J 49/0027 |
| 2019/0055640 | A1 | 2/2019 | Sakio et al. | |

FOREIGN PATENT DOCUMENTS

| | | | |
|---|---|---|---|
| JP | 1982-126161 | U | 8/1982 |
| JP | 03-285246 | A | 12/1991 |
| JP | 07-142026 | A | 6/1995 |
| JP | 10-106484 | A | 4/1998 |
| TW | 201730358 | A | 9/2017 |
| WO | 2017/145402 | A1 | 8/2017 |

OTHER PUBLICATIONS

U.S. Appl. No. 16/771,542, filed Jun. 10, 2020.

U.S. Appl. No. 16/771,547, filed Jun. 10, 2020.

International Search Report for PCT/JP2018/004159 dated Mar. 3, 2018 [PCT/ISA/210].

Written Opinion for PCT/JP2018/004159 dated Mar. 3, 2018 [PCT/ISA/237].

International Search Report for PCT/JP2018/004160 dated Mar. 20, 2018 [PCT/ISA/210].

Written Opinion for PCT/JP2018/004160 dated Mar. 20, 2018 [PCT/ISA/237].

International Search Report for PCT/JP2018/004161 dated Apr. 24, 2018 [PCT/ISA/210].

Written Opinion for PCT/JP2018/004161 dated Apr. 24, 2018 [PCT/ISA/237].

International Search Report for PCT/JP2018/004162 dated May 1, 2018 [PCT/ISA/210].

Written Opinion for PCT/JP2018/004162 dated May 1, 2018 [PCT/ISA/237].

* cited by examiner

MASS SPECTROMETER

CROSS REFERENCE TO RELATED APPLICATIONS

This application is a National Stage of International Application No. PCT/JP2018/004159 filed Feb. 7, 2018.

TECHNICAL FIELD

The present invention relates to a mass spectrometer including a quadrupole mass filter or a linear ion trap as a mass separator.

BACKGROUND ART

A general quadrupole mass spectrometer for use in a gas chromatograph mass spectrometer (GC-MS) or the like generates ions from a compound contained in a sample gas in an ion source, separates the various generated ions by using a quadrupole mass filter according to a mass-to-charge ratio m/z, and detects the separated ions by using an ion detector. When mass scanning is repeated within a range of a predetermined mass-to-charge ratio in the quadrupole mass filter, mass spectrums indicating a relationship between the mass-to-charge ratio and intensity of ions are repeatedly acquired.

The quadrupole mass filter is generally configured so that four rod electrodes each having a substantially cylindrical outer shape are arranged around a central axis to be substantially parallel to each other and are also arranged around the central axis at the same angular intervals (i.e., at 90° intervals). In order to separate ions according to the mass-to-charge ratio, a voltage $+(U+V\cos\omega t)$ obtained by superposing a radio frequency voltage on a positive DC voltage is applied to two rod electrodes facing each other across a central axis, and a voltage $-(U+V\cos\omega t)$ obtained by superposing a voltage having a phase inverted from that of the radio frequency voltage on a negative DC voltage is applied to the other two rod electrodes. By setting the value U of the DC voltage and the amplitude V of the radio frequency voltage to predetermined values according to a target mass-to-charge ratio, ions having the target mass-to-charge ratio can be selectively passed.

In order for target ions to pass through the quadrupole mass filter with high efficiency and high selectivity, it is necessary to arrange the four rod electrodes with high positional accuracy. Meanwhile, it is desired to reduce assembly work as much as possible for arranging the rod electrodes with such high positional accuracy. Therefore, conventional apparatuses are generally configured so that a positional relationship among four rod electrodes can be determined by fitting the rod electrodes into grooves formed in a rod holder made from an insulating material such as ceramic (see Patent Literatures 1 and 2).

FIG. 7 is a plan view illustrating a state in which rod electrodes are held by a rod holder in a conventional quadrupole mass spectrometer, and FIG. 8 is a cross-sectional view taken along the line A-AA of FIG. 7. As illustrated in the drawings, four rod electrodes 50*a* to 50*d* are fixed to an annular rod holder 51 while being fitted into grooves formed on the inner face of the rod holder 51. In this case, the grooves inside the rod holder 51 are provided so that sizes, shapes, and positions of the grooves are exactly rotationally symmetric about a central axis C, which brings the four rod electrodes 50*a* to 50*d* to have an ideal or nearly ideal relative positional relationship.

However, as disclosed in Patent Literatures cited above, the quadrupole mass filter having such a configuration has a problem that, when a radio frequency voltage is applied to the rod electrodes 50*a* to 50*d*, the rod holder 51 itself generates heat due to dielectric loss of the material of the rod holder 51, and distances between the rod electrodes 50*a* to 50*d* change due to thermal expansion. When the distances between the rod electrodes 50*a* to 50*d* change, the mass-to-charge ratio of ions to be passed differs from that of ions that actually pass, or a range of a mass-to-charge ratio of passing ions expands. That is, thermal expansion caused by heat generation of the rod holder 51 causes a deterioration in mass accuracy and mass resolution.

The easiest method to solve the above problems is to use a material having a low coefficient of thermal expansion for the rod holder. However, a material having a low coefficient of thermal expansion is generally expensive, and the use of such a material leads to an increase in cost. Further, such a material may not be always suitable for the rod holder in terms of other characteristics such as workability. Thus, it is difficult to select a material having a low coefficient of thermal expansion in some cases. Furthermore, even if a material having a small coefficient of thermal expansion is used, the thermal expansion caused by heat generation cannot be completely eliminated. Thus, in a case where higher accuracy or resolution is required, it is necessary to take measures other than material selection.

Patent Literature 1 discloses an apparatus configured so that a rod holder is sandwiched between a pair of heat releasing plates connected by a spring to release heat generated in the rod holder to the heat releasing plates in contact with the rod holder, thereby promoting heat release. However, such a configuration is complicated, and maintainability of the rod electrodes is deteriorated.

Patent Literature 2 discloses a technique of detecting an amount of distortion of a rod holder caused by thermal expansion and finely adjusting the voltage applied to each rod electrode according to the detected amount of distortion, thereby reducing a mass shift. However, in such a method, it is necessary to obtain a relationship between an amount of change in temperature or amount of distortion and an amount of voltage adjustment in advance with high accuracy. If such a relationship changes, the mass shift may not be sufficiently corrected. Further, the configuration itself is considerably complicated, and a significant increase in costs is inevitable.

CITATION LIST

Patent Literature

Patent Literature 1: JP H07-142026 A (FIGS. 1 and 2)
Patent Literature 2: JP H10-106484 A (FIGS. 5 and 6)
Patent Literature 3: U.S. Pat. No. 5,525,084 A

SUMMARY OF INVENTION

Technical Problem

Those are not problems that occurs not only to a mass spectrometer including a quadrupole mass filter, but also to an ion optical element having a configuration in which a plurality of rod electrodes needs to be arranged around a central axis with high positional accuracy, specifically, a linear ion trap having a function of mass separation by itself.

The present invention has been made to solve such problems, and an object of the present invention is to provide a mass spectrometer capable of reducing heat generation of a rod holder that holds a plurality of rod electrodes forming a quadrupole mass filter or linear ion trap and minimizing a deterioration in mass accuracy and mass resolution caused by thermal expansion of the rod holder.

Solution to Problem

A mass spectrometer according to the present invention that has been made to solve the above problems includes:

a) an ion optical element including a plurality of rod electrodes arranged around a linear axis and a rod holder made from an insulating material and configured to hold the plurality of rod electrodes, the ion optical element being configured to separate ions introduced into a space surrounded by the plurality of rod electrodes according to a mass-to-charge ratio using an electric field formed by a radio frequency voltage applied to the rod electrodes; and b) a boundary member configured to define a region in which the ion optical element is arranged, in which at least part of a surface of the boundary member, the surface facing the ion optical element, is subjected to an emissivity improvement processing.

In the mass spectrometer according to a first aspect of the present invention, at least part of the boundary member may be a vacuum housing, and the surface that is subjected to the emissivity improvement processing may be an inner wall surface of the vacuum housing.

Further, in the mass spectrometer according to a second aspect of the present invention, at least part of the boundary member may be at least one of a lens that is arranged on an upstream side of an ion current to the ion optical element and configured to converge ions and introduce the ions into the space of the ion optical element or a lens that is arranged on a downstream side of the ion current from the ion optical element and configured to converge ions and send the ions to a part behind the ion optical element, and the surface that is subjected to the emissivity improvement processing may be a surface of the lens, the surface facing the ion optical element.

As a matter of course, it is also possible to adopt a configuration in which both the first aspect and the second aspect are combined.

In the mass spectrometer according to the present invention, the ion optical element is typically a quadrupole mass filter or a linear ion trap.

In a case where the ion optical element is a quadrupole mass filter, the mass spectrometer according to the present invention is, for example, a single quadrupole mass spectrometer, a triple quadrupole mass spectrometer in which quadrupole mass filters are arranged in front of and behind a collision cell, or a quadrupole-time-of-flight (Q-TOF) mass spectrometer in which a quadrupole mass filter is arranged in front of a collision cell and a time-of-flight mass spectrometer is arranged behind the collision cell. Further, in a case where the ion optical element is a linear ion trap, the mass spectrometer according to the present invention is, for example, a linear ion trap mass spectrometer or a mass spectrometer that dissociates, in a linear ion trap, ions that have been mass-sorted by the ion trap and then performs mass spectrometry by using an external time-of-flight mass spectrometer, Fourier-transform ion cyclotron resonance mass spectrometer, or the like.

In the mass spectrometer of this kind, the vacuum housing or lens that can be part of the boundary member is made from aluminum or stainless steel. The emissivity of stainless steel is about 0.3, and the emissivity of aluminum is even lower, which is equal to or less than 0.1. Heat generated by dielectric loss of the rod holder is radiated from the rod holder into a region defined by the boundary member directly or through another member that fixes the rod holder to the boundary member. If the emissivity of the surface of the boundary member facing the ion optical element is low, radiated heat is not absorbed much and is reflected by the boundary member as described above, and the heat is trapped in the region defined by the boundary member. This deteriorates heat release efficiency.

Meanwhile, in the first aspect of the present invention, a predetermined emissivity improvement processing is performed on at least part of the inner wall surface of the vacuum housing to improve heat absorption on the inner wall surface of the vacuum housing. Therefore, the heat radiated from the rod holder into the vacuum directly or through another member that fixes the rod holder in the vacuum housing is efficiently absorbed by the inner wall of the vacuum housing. As a result, a heat release property from the rod holder is improved, and thus a rise in temperature of the rod holder can be reduced.

Further, in the second aspect of the present invention, part of the surface of the lens arranged just in front of or just behind the ion optical element is subjected to the predetermined emissivity improvement processing to improve heat absorption on the surface of the lens. Therefore, as in the first aspect, the heat radiated from the rod holder into the region defined by the boundary member directly or through another member that fixes the rod holder to the boundary member such as the vacuum housing is efficiently absorbed by the lens. As a result, a heat release property from the rod holder is improved, and thus a rise in temperature of the rod holder can be reduced.

In the present invention, the emissivity improvement processing may be various processing.

As an aspect of the present invention, the emissivity improvement processing may be a surface treatment on a surface of a material from which the boundary member is made.

The surface treatment is roughly classified into two kinds of processing: a coating film forming processing of forming some thin coating film on the surface by a plating process, a painting or coating process, a thermal spraying process, or the like; and a processing of roughening the surface (forming unevenness) by chemically or physically shaving the surface.

In a case where the boundary member is made from aluminum, the surface treatment may be an anodizing processing. Further, the surface treatment may be a nickel plating process. Further, the surface treatment may be a carbon coating film forming processing. In the case of the anodizing processing, the emissivity can be further improved by performing a black anodizing process in which the surface is blackened by a method such as coloring the surface with a black dye after the anodizing process. In the case of the nickel plating processing, the emissivity can be further improved by performing a black nickel plating process in which the surface is blackened by a method such as oxidizing the surface to blacken the surface after the nickel plating process. Further, the surface treatment may be a ceramic spraying processing.

As still another aspect, the emissivity improvement processing may be a processing of attaching a thin plate or a thin foil made from another material to an inner wall surface of the material from which the boundary member is made. For example, in a case where the boundary member is made from aluminum, a thin stainless steel plate may be attached to the surface of the boundary member facing the ion optical element.

A processing that is adopted can be determined in consideration of an influence of gas (outgas) released from a product formed by those processes under the environment (generally, vacuum) in the region defined by the boundary member, costs, and the like.

Advantageous Effects of Invention

According to a mass spectrometer of the present invention, it is possible to improve the heat release property from a rod holder that holds rod electrodes and reduce a rise in temperature of the rod holder. This makes it possible to minimize a deterioration in mass accuracy and mass resolution caused by thermal expansion of the rod holder. Further, although a degree of increase in costs differs depending on the kind of an emissivity improvement processing, the increase in costs is considerably suppressed as compared with processing adopted in conventional apparatuses. Further, the rod holder can also be made from a material having a relatively large coefficient of thermal expansion. This makes it possible to increase a range of selection of the material and reduce costs.

DESCRIPTION OF EMBODIMENTS

An embodiment of a mass spectrometer according to the present invention will be described with reference to the accompanying drawings.

Figure 1:
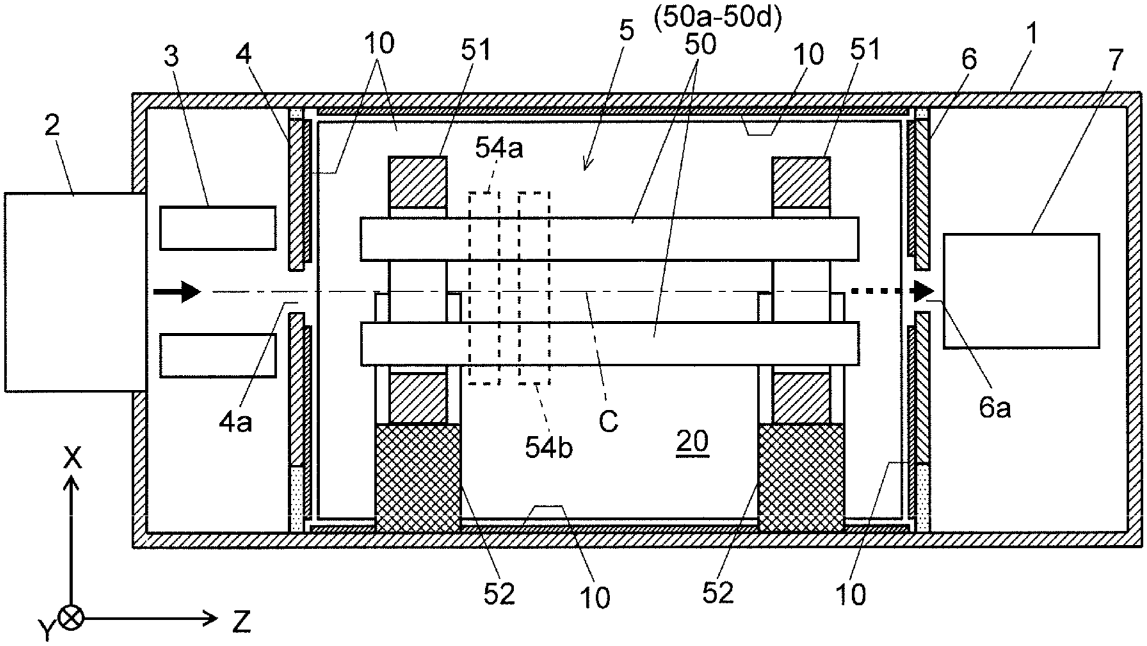
FIG. 1 illustrates a configuration of a main part of a quadrupole mass spectrometer according to an embodiment of the present invention.

FIG. 1 illustrates a schematic configuration of the mass spectrometer of this embodiment. This mass spectrometer is a single quadrupole mass spectrometer that analyzes components in a sample gas.

As illustrated in FIG. 1, a vacuum housing 1 evacuated by a vacuum pump (not illustrated) is provided with an ion source 2 that performs ionization by an electron ionization method, a chemical ionization method, or the like, and ions derived from a sample component, which are generated in the ion source 2, are introduced into the vacuum housing 1. In the vacuum housing 1, an ion guide 3 that transports ions while converging the ions, a quadrupole mass filter unit 5 including four rod electrodes 50*a* to 50*d* (it should be noted that only two of the four rod electrodes are illustrated in FIG. 1) arranged around a central axis C that is also an ion optical axis, an ion detector 7 that detects ions, an inlet lens 4 that also serves as a partition separating the ion guide 3 from the quadrupole mass filter unit 5 and has an opening 4*a* through which ions pass, and an outlet lens 6 that also serves as a partition separating the quadrupole mass filter unit 5 from the ion detector 7 and has an opening 6*a* through which ions pass are arranged. That is, in this embodiment, part of the vacuum housing 1, the inlet lens 4, and the outlet lens 6 correspond to a boundary member in the present invention, and the quadrupole mass filter unit 5 is arranged in an internal region 20 defined by the boundary member. For convenience of explanation, the ion optical axis is defined as a direction of a Z axis, and X and Y axes orthogonal to the Z axis are defined as illustrated in FIG. 1.

The vacuum housing 1 is made from a conductive material, and aluminum, which is relatively inexpensive, is used herein. The inlet lens 4 and the outlet lens 6 are also made from a conductive material, and aluminum is used herein, as in the case of the vacuum housing 1. However, materials of those members are not limited thereto, and, for example, stainless steel may be used.

Figure 2:
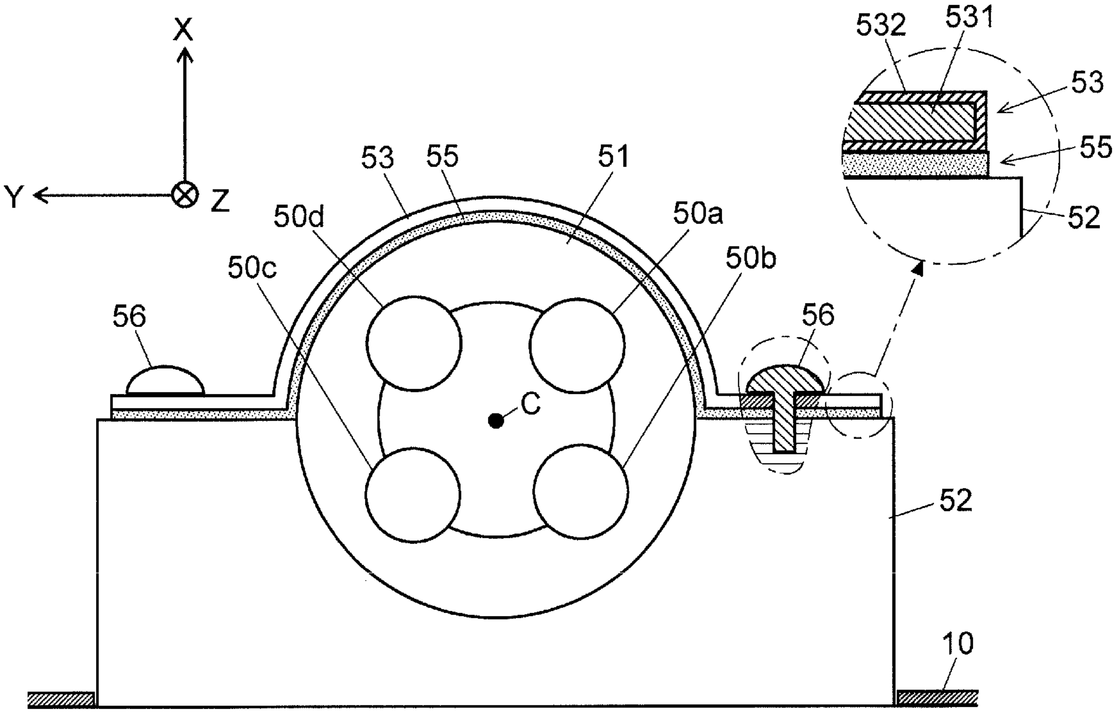
FIG. 2 is a plan view of a quadrupole mass filter unit in the quadrupole mass spectrometer of this embodiment, which is viewed from an ion entering side.
Figure 3:
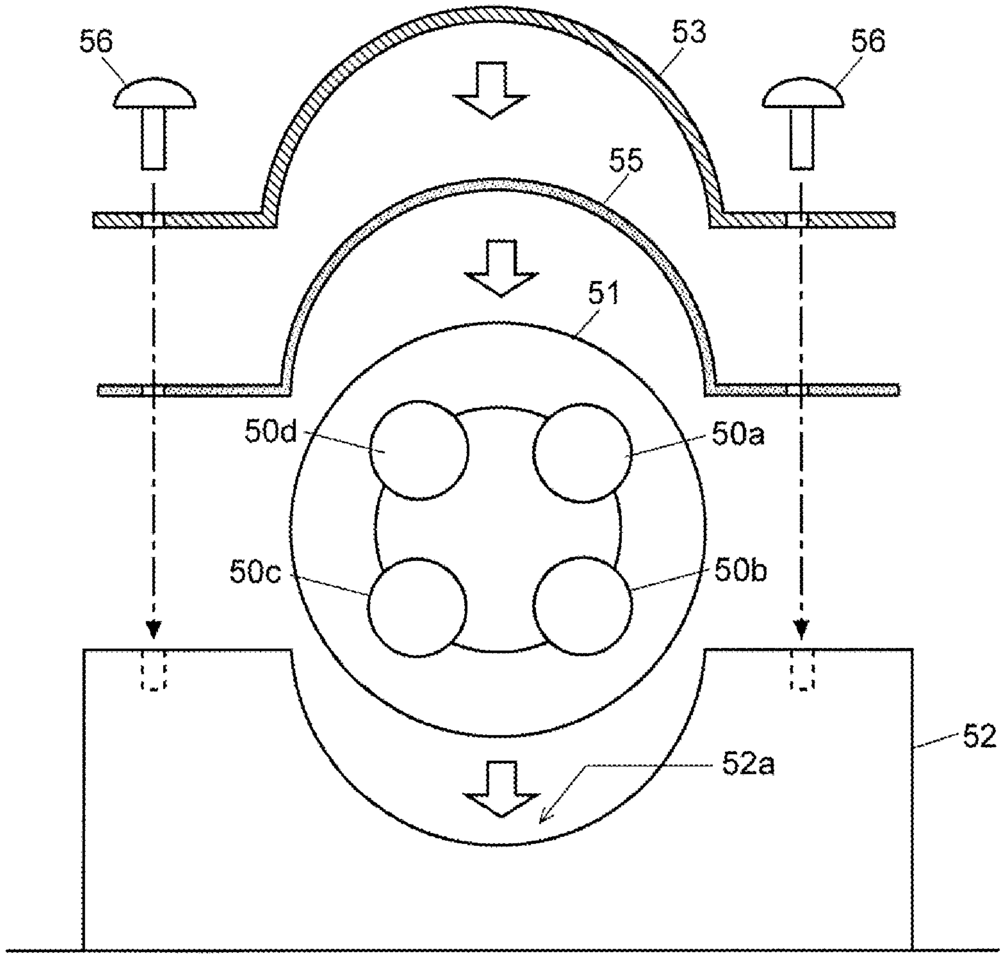
FIG. 3 is an exploded view of the quadrupole mass filter unit illustrated in FIG. 2.
Figure 4:
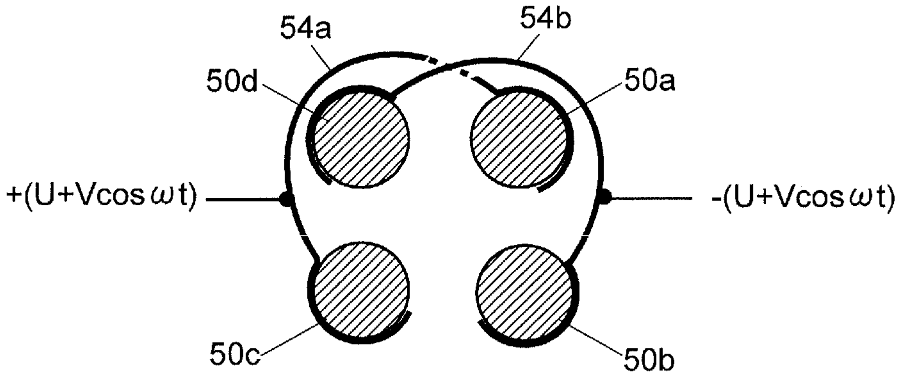
FIG. 4 is a schematic diagram illustrating short springs that connect rod electrodes in a quadrupole mass filter unit.

FIG. 2 is a plan view of the quadrupole mass filter unit 5 in FIG. 1, which is viewed from an ion entering side (left side in FIG. 1). FIG. 3 is an exploded view of the quadrupole mass filter unit 5 illustrated in FIG. 2. FIG. 4 is a schematic diagram illustrating short springs that connect the rod electrodes 50*a* to 50*d* in the quadrupole mass filter unit 5.

Each of the four rod electrodes 50*a* to 50*d* having a substantially cylindrical outer shape is fixed to a substantially annular rod holder 51 having a predetermined thickness with screws (not illustrated) while being fitted into a groove inside the rod holder 51. The rod holder 51 is provided on each of the front and rear end sides of the rod electrodes 50*a* to 50*d*. With this, a relative positional relationship among the four rod electrodes 50*a* to 50*d* is determined. Each of the two rod holders 51 is placed on a substantially semicircular concave portion 52*a* of a holder sustaining stand 52 attached on a bottom surface of the vacuum housing 1. That is, substantially a lower half of the rod holder 51 is housed in the concave portion 52*a* of the holder sustaining stand 52. Substantially an upper half of the rod holder 51 is fixed downward, i.e., is fixed to be pressed against the concave portion 52*a* of the holder sustaining stand 52 by a fixation band 53 fixed to the holder sustaining stand 52 with two screws 56. With this, absolute positions of the four rod electrodes 50*a* to 50*d* are determined.

In the quadrupole mass filter, the same voltage is applied to two rod electrodes facing each other across the central axis C, and different voltages are applied to two rod electrodes adjacent to each other around the central axis C. Therefore, in the apparatus of this embodiment, as illustrated in FIG. 4, a pair of the rod electrodes 50*a* and 50*c* and a pair of the rod electrodes 50*b* and 50*d* facing each other across the central axis C are electrically connected by two respective short springs 54*a* and 54*b*. The short springs 54*a* and 54*b* adhere to each of the rod electrodes 50*a* to 50*d* by elastic force. A voltage $U+V\cos\omega t$, which is obtained by superposing a DC voltage U on a radio frequency voltage $V\cos\omega t$, is applied to one short spring 54*a* from a voltage source (not illustrated), and a voltage $-(U+V\cos\omega t)$, which is obtained by superposing a DC voltage $-U$ having an inverted polarity on a radio frequency voltage $-V\cos\omega t$ having an inverted phase, is applied to the other short spring 54*b*.

The four rod electrodes 50*a* to 50*d* are made from a conductor, and, for example, stainless steel or molybdenum is used. The rod holder 51 is made from an insulator, and appropriate ceramic is used. The holder sustaining stand 52 is made from the same material as that of the vacuum housing 1, and is made from, for example, aluminum. The other members will be described later.

Basic analysis operation in the mass spectrometer of this embodiment will be briefly described.

The ion source 2 ionizes components in a sample gas introduced from the outside. The generated ions are extracted from the ion source 2, are introduced into the vacuum housing 1, are converged by the ion guide 3, and are introduced into a separated space extending in the Z-axis direction and surrounded by the four rod electrodes 50*a* to 50*d* through the opening 4*a* of the inlet lens 4. A voltage, which is obtained by superposing a DC voltage on a radio frequency voltage according to a mass-to-charge ratio of target ions to be measured, is applied to the four rod electrodes 50*a* to 50*d* through the short springs 54*a* and 54*b* as described above. A quadrupole electric field formed by the voltage allows only the target ions to pass through the separated space while causing the target ions to stably oscillate. Meanwhile, other ions diverge in the middle. The target ions selected according to the mass-to-charge ratio in this way pass through the separated space and arrive at the ion detector 7 through the opening 6*a* of the outlet lens 6. The ion detector 7 outputs a detection signal having a signal strength corresponding to an amount of the arrived ions.

During the above analysis, a radio frequency voltage $\pm V \cos \omega t$ having a relatively large amplitude is applied to the four rod electrodes 50*a* to 50*d*. With this, a strong radio frequency electric field is formed in the separated space. Therefore, the rod holder 51 itself generates heat due to dielectric loss of the material of the rod holder 51, and thermal expansion of the rod holder causes a change in a relative positional relationship between the four rod electrodes 50*a* to 50. Further, in some cases, the heat of the rod holder 51 is transmitted to the rod electrodes 50*a* to 50*d*, and the rod electrodes 50*a* to 50*d* themselves are deformed due to thermal expansion, and thus distances between the rod electrodes 50*a* to 50*d* are changed. If the relative positional relationship or the distances between the rod electrodes 50*a* to 50 change, characteristics of the quadrupole mass filter, i.e., mass resolution and mass accuracy may be deteriorated. In view of this, various measures are taken in the mass spectrometer of this embodiment in order to reduce a change in the relative positional relationship between the rod electrodes 50*a* to 50*d* and deformation of the rod electrodes caused by the heat generation of the rod holder 51. This point will be described in detail.

In order to reduce the heat generation of the rod holder 51, it is only necessary to increase the heat release property of the rod holder 51. Herein, there are the following five heat release paths:

(1) conduction of the heat from the rod holder 51 to the holder sustaining stand 52, and then to the vacuum housing 1, and release of the heat from the vacuum housing 1 to the outside;

(2) conduction of the heat from the rod holder 51, to the fixation band 53, to the holder sustaining stand 52, and then to the vacuum housing 1, and release of the heat from the vacuum housing 1 to the outside;

(3) conduction of the heat from the rod holder 51 to the fixation band 53, radiation of the heat from the fixation band into the vacuum in the vacuum housing 1, and release of the heat from the vacuum housing 1 to the outside;

(4) conduction of the heat from the rod holder 51 to the rod electrodes 50*a* to 50*d* and the short springs 54*a* and 54*b*, radiation of the heat from the rod electrodes 50*a* to 50*d* and the short springs 54*a* and 54*b* into the vacuum in the vacuum housing 1, and release of the heat from the vacuum housing 1 to the outside; and (5) radiation of the heat from the rod holder 51 into the vacuum in the vacuum housing 1, and release of the heat from the vacuum housing 1 to the outside.

Each of the heat release paths (3), (4), and (5) includes radiation of the heat into the vacuum in the vacuum housing 1. Therefore, the heat release property in the heat release paths (3), (4), and (5) can be increased by increasing efficiency of this heat release. One of major factors that deteriorate the efficiency of the heat radiation is that heat is trapped in the internal region 20 in which the quadrupole mass filter unit 5 is arranged. In view of this, in the apparatus of this embodiment, in order to increase the efficiency of this heat radiation, inner wall surfaces of the vacuum housing 1 defining the internal region 20 and surfaces of the inlet lens 4 and the outlet lens 6 facing the quadrupole mass filter unit 5 are subjected to a surface treatment processing to increase emissivity. Herein, the inner wall surfaces of the vacuum housing 1 defining the internal region 20 are a bottom surface, a top surface, and side surfaces (in FIG. 1, a surface behind the quadrupole mass filter unit 5 and a surface in front of the quadrupole mass filter unit 5 (not illustrated)).

In the apparatus of this embodiment, as the surface treatment processing, a coating film layer 10 formed by a black nickel plating process is formed on the inner wall surfaces of the vacuum housing 1 and part of the surfaces of the inlet lens 4 and the outlet lens 6. As is well known, black nickel plating is one of commonly used plating for the purpose of antireflection and decoration, and a processing cost is relatively low. When the coating film layer 10 is formed by black nickel plating, the surfaces become black. This improves the emissivity as compared with a case where the surfaces are aluminum surfaces. High emissivity means high heat absorption. With this, the heat radiated from the rod electrodes 50*a* to 50*d*, the fixation band 53, and the like into the vacuum is efficiently absorbed by the inner wall surfaces of the vacuum housing 1, the inlet lens 4, and the outlet lens 6. Thus, the heat is less likely to be trapped in the vicinity of the quadrupole mass filter unit 5. As a result, the heat release property in the heat release paths (3), (4), and (5) can be increased as compared with conventional ones.

Note that the surface treatment processing for increasing the emissivity is not limited to black nickel plating. For example, in a case where the vacuum housing 1 is made from aluminum as described above, normal nickel plating may be used instead of black nickel plating, or a coating film layer may be formed by an anodizing process (preferably, a black anodizing process). Alternatively, a coating film layer capable of improving the emissivity may be formed on the surfaces by a carbon coating film forming process, a ceramic spraying process, other plating processes, a painting or coating process, a thermal spraying process, or the like. Further, instead of forming a coating film layer made from a material different from the material of the vacuum housing 1, the inlet lens 4, and the outlet lens 6, the surfaces of those members themselves may be chemically or physically shaved to form unevenness. Further, instead of forming a coating film layer by various processes, a thin plate or thin foil made from another material having higher emissivity than that of the vacuum housing 1, the inlet lens 4, and the outlet lens 6 may be attached to the inner wall surfaces of the vacuum housing 1, the inlet lens 4, and the outlet lens 6, or a black body tape may be attached to the inner wall surfaces of the vacuum housing 1, the inlet lens 4, and the outlet lens 6. Those are also surface treatment processings in a broad sense.

As a matter of course, the above surface treatment processings for increasing the emissivity may be performed not on all of the inner wall surfaces of the vacuum housing 1, the inlet lens 4, and the outlet lens 6, but only on part of the inner wall surfaces of the vacuum housing 1, the inlet lens 4, and the outlet lens 6. Further, different kinds of surface treatment processings may be combined. Note that, as a matter of course, both the inlet lens 4 and the outlet lens 6 form an electric field for converging ions. Thus, the surface treatment processing needs to be performed so as not to hinder such formation of the electric field.

As can be seen by comparing the above heat release paths (1) and (2), the heat is conducted from the rod holder 51 to the holder sustaining stand 52 through the fixation band 53 in (2), and thus heat release efficiency is lower in (2) than in (1). Therefore, a temperature of an upper part of the rod holder 51 tends to be higher than that of a lower part of the rod holder. In order to improve the heat release efficiency in the heat release path (2), it is necessary to improve thermal conductivity of the fixation band 53 itself. Stainless steel is generally used as a material of the fixation band 53, but stainless steel has relatively low thermal conductivity. Therefore, in the apparatus of this embodiment, phosphor bronze, which has higher thermal conductivity than that of stainless steel and is relatively inexpensive, is used as the material of the fixation band 53.

As described above, the fixation band 53 fixes the rod holder 51 so as to press the rod holder 51 against the holder sustaining stand 52, and thus requires an appropriate spring property. If the fixation band 53 has a low spring property, the fixation band 53 is hindered from expanding outward when the rod holder 51 thermally expands. Thus, deformation caused by the heat concentrates on the inside, i.e., on a part holding the rod electrodes 50*a* to 50*d*. This increases displacement of the relative positions of the rod electrodes 50*a* to 50*d*. Meanwhile, in a case where the fixation band 53 has an appropriate spring property, the fixation band 53 stretches and the rod holder 51 expands outward when the rod holder 51 thermally expands. Thus, the displacement of the relative positions of the rod electrodes 50*a* to 50*d* can be small. However, if the fixation band 53 has an extremely high spring property, fixation of the rod holder 51 becomes unstable. Thus, the absolute positions of the rod electrodes 50*a* to 50*d* may be displaced due to vibration or the like.

Phosphor bronze has a smaller modulus of longitudinal elasticity than that of stainless steel. Thus, a thickness of the fixation band 53 is increased to obtain the same degree of spring property as that of a stainless fixation band. When the thickness of the fixation band 53 is increased as described above, the thermal conductivity is increased as compared with a case of a thin fixation band. That is, the material itself has high thermal conductivity, and, in addition, a large thickness can further improve the thermal conductivity. This makes it possible to increase the heat release property in the above heat release path (2) as compared with conventional ones.

Note that, because phosphor bronze is more likely to rust than stainless steel, a surface of phosphor bronze is subjected to a gold plating processing to prevent rust. As a matter of course, other rustproofing surface treatments may be performed.

Further, the short springs 54*a* and 54*b*, as well as the fixation band 53, are made from phosphor bronze, and surfaces of the short springs are plated with gold. In a case where the temperature of the upper part of the rod holder 51 is higher than that of the lower part as described above, temperatures of the upper rod electrodes 50*a* and 50*d* are higher than those of the lower rod electrodes 50*b* and 50*c* due to heat transfer from the rod holder 51. When the short springs 54*a* and 54*b* are made from phosphor bronze having higher thermal conductivity than that of stainless steel, the heat of the upper rod electrodes 50*a* and 50*d* is easily transmitted to the lower rod electrodes 50*b* and 50*c* through the short springs 54*a* and 54*b*. Thus, it is possible to reduce a difference in temperature between the upper rod electrodes 50*a* and 50*d* and the lower rod electrodes 50*b* and 50*c*. This makes it possible to suppress uneven deformation of the rod electrodes 50*a* to 50*d* caused by thermal expansion of the rod electrodes themselves.

Further, as described above, the fixation band 53 and the short springs 54*a* and 54*b* are made from phosphor bronze that has been subjected to a gold plating surface treatment. In addition, a coating film layer is further formed on a surface of gold-plated phosphor bronze by a surface treatment process for increasing the emissivity which is similar to that of the above coating film layer 10. That is, as illustrated in FIG. 2, the fixation band 53 has a coating film layer 532 formed by a black nickel plating process on the entire surface of a main member 531 made from phosphor bronze that has been subjected to a gold plating surface treatment. Although not illustrated, the same applies to the short springs 54*a* and 54*b*.

By providing the coating film layer 532 on the surfaces of the fixation band 53 and the short springs 54*a* and 54*b* as described above, the efficiency of the heat radiation from the fixation band 53 and the short springs 54*a* and 54*b* into the surrounding space is increased. That is, the heat is not only easily transmitted to the fixation band 53 and the short springs 54*a* and 54*b*, but also highly dissipated in the middle of a path of the heat transfer. This makes it possible to further increase the heat release property in the heat release paths (3) and (4).

The coating film layer 532 formed on the surfaces of the fixation band 53 and the short springs 54*a* and 54*b* is not limited to a coating film layer formed by a black nickel plating process, and may be formed by various other methods similar to those of the coating film layer 10.

Further, in the apparatus of this embodiment, when the fixation band 53 is fixed to the holder sustaining stand 52 while the rod holder 51 is being sandwiched between the fixation band 53 and the holder sustaining stand 52, a heat release layer 55 is formed between the fixation band 53 and the rod holder 51 and the holder sustaining stand 52. In the apparatus of this embodiment, a coating film layer of an appropriate thickness made from heat dissipation silicone (e.g., a silicone rubber sheet or a silicone tape) is used as the heat release layer 55. However, the heat release layer is not limited to this, and a coating layer of heat dissipation grease or the like may be used. In a case where the fixation band 53 and the rod holder 51 or the holder sustaining stand 52 are brought into direct contact with each other, a contact surface between the both has a gap at an extremely fine level, and the gap serves as a kind of thermal resistance. Meanwhile, the heat release layer 55 provided between the fixation band 53 and the rod holder 51 or the holder sustaining stand 52 fills the gap of such an extremely fine level. This increases the heat transfer property. Further, the heat dissipation silicone and the heat dissipation grease themselves contain components and particles having high thermal conductivity. This makes it possible to increase the heat transfer property from the rod holder 51 to the fixation band 53 and the heat transfer property from the fixation band 53 to the holder sustaining stand 52. Thus, it is possible to further increase the heat release property in the above heat release paths (2) and (3).

As described above, the apparatus of this embodiment can reduce a rise in temperature of the rod holder 51 and the rod electrodes 50*a* to 50*d* by devising structural measures for increasing the heat release property in the above heat release paths (1) to (5). As a matter of course, even in a case where not all the above structural measures but only some measures are adopted, the rise in temperature of the rod holder 51 and the rod electrodes 50*a* to 50*d* can be reduced as compared with conventional apparatuses.

Figure 5:
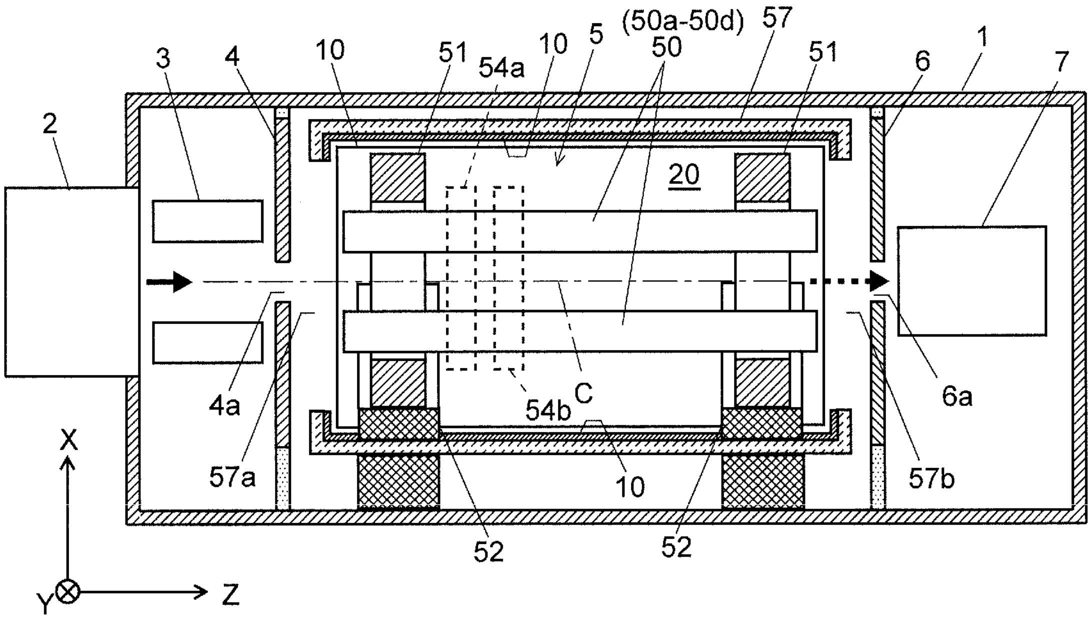
FIG. 5 illustrates a configuration of a main part of a quadrupole mass spectrometer according to another embodiment of the present invention.

Note that, in the mass spectrometer of the above embodiment, the quadrupole mass filter unit 5 is directly arranged inside the vacuum housing 1. However, as in the apparatus disclosed in Patent Literature 3, the quadrupole mass filter unit 5 may be arranged in the vacuum housing 1 while being attached in a cylindrical container. FIG. 5 illustrates a configuration of a main part of a quadrupole mass spectrometer having such a configuration. In this configuration, the internal region 20 is provided in a container 57 having an inlet opening 57*a* and an outlet opening 57*b*, and the quadrupole mass filter unit 5 is arranged in the internal region 20. The container 57 corresponds to the boundary member in the present invention. In this configuration, the coating film layer 10 may be formed by a black nickel plating process on inner wall surfaces of the container 57 defining the internal region 20, or other surface treatment processings for increasing the emissivity described above may be performed on the inner wall surfaces. This makes it possible to increase the heat release efficiency of a heat release path to the vacuum housing 1 through the container 57.

Figure 6:
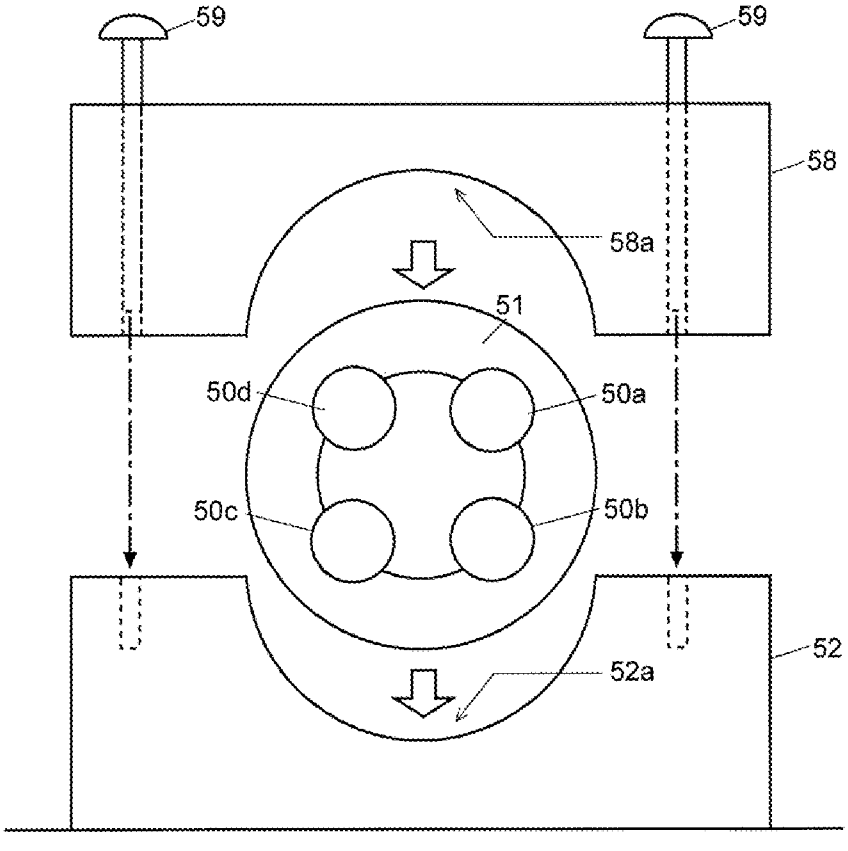
FIG. 6 is an exploded view of another example of a quadrupole mass filter unit.
Figure 7:
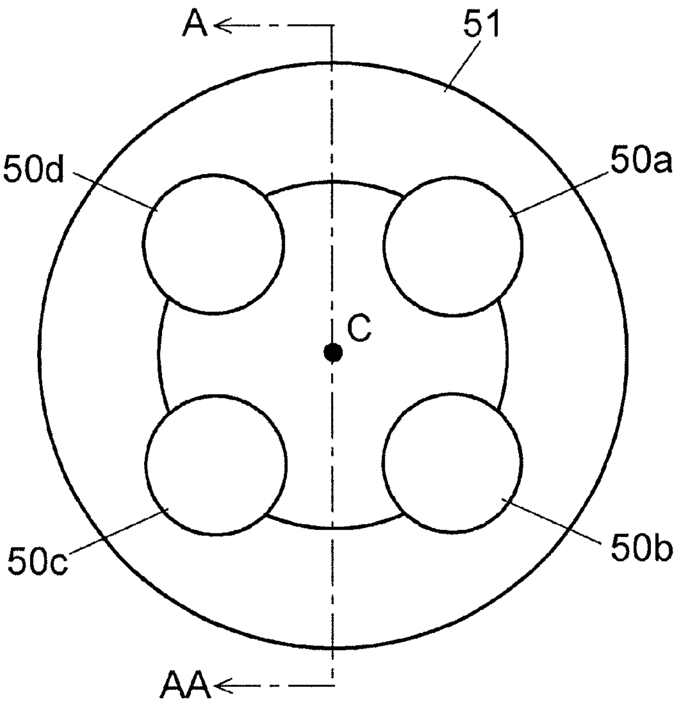
FIG. 7 is a plan view illustrating a state in which rod electrodes are held by a rod holder in a general quadrupole mass spectrometer.
Figure 8:
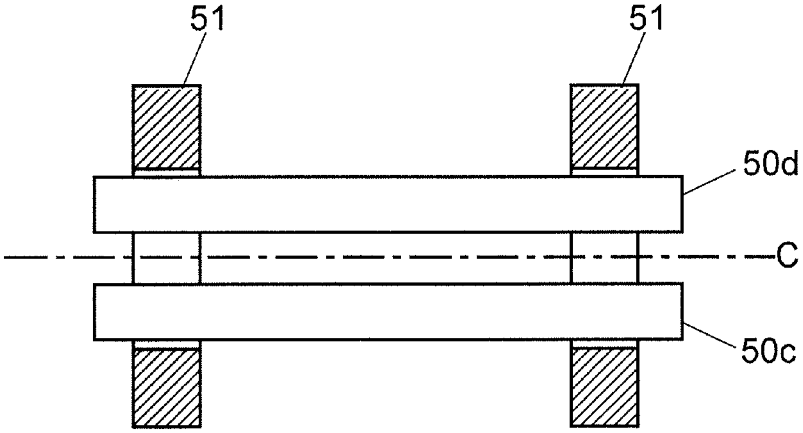
FIG. 8 is a cross-sectional view taken along the line A-AA of FIG. 5.

In the above embodiment, the rod holder 51 is fixed to the holder sustaining stand 52 by the thin-plate like fixation band 53. However, various fixation members for fixing the rod holder 51 to the holder sustaining stand 52 can be adopted. For example, as illustrated in FIG. 6, a block-shaped fixation member 58 having a concave portion 58*a* similar to the concave portion 52*a* of the holder sustaining stand 52 may be fixed to the holder sustaining stand 52 with screws 59. As described above, a band-shaped fixation member having an appropriate spring property to fix the rod holder 51 to the holder sustaining stand 52 is preferable to block-shaped one. However, even in a case where the block-shaped fixation member 58 is adopted, the heat release property in the heat release paths (3) and (4) can be increased by performing a surface treatment process for increasing the emissivity on a surface of the fixation member 58.

The above embodiment is an example in which the present invention is applied to a single quadrupole mass spectrometer. However, it is apparent that the present invention is applicable to other mass spectrometers including a quadrupole mass filter, specifically, a triple quadrupole mass spectrometer and a quadrupole-time-of-flight mass spectrometer.

Further, the present invention is also applicable to a mass spectrometer including a linear ion trap having a rod electrode structure similar to that of a quadrupole mass filter, instead of a quadrupole mass filter, and having a function of separating ions according to a mass-to-charge ratio. Such a linear ion trap traps ions once in a trapping space surrounded by four rod electrodes, and then applies a radio frequency voltage corresponding to a mass-to-charge ratio of target ions to the four rod electrodes, thereby exciting some of the trapped ions and releasing the ions from the trapping space to the outside. Therefore, if a rod holder that holds the rod electrodes generates heat due to dielectric loss and a relative positional relationship between the rod electrodes changes, the mass-to-charge ratio of the ions released from the trapping space differs, or a range of the mass-to-charge ratio changes. When the present invention is applied to such a mass spectrometer, it is possible to reduce a change in the relative positional relationship among the rod electrodes and increase mass accuracy and mass resolution of the ions released from the trapping space.

Further, the above embodiment and modification examples are merely examples of the present invention, and thus it is apparent that further appropriate modifications, additions, and adjustments within the spirit of the present invention are also included in the scope of the claims of the present application.

REFERENCE SIGNS LIST

1 . . . Vacuum Housing
2 . . . Ion Source
3 . . . Ion Guide
4 . . . Inlet Lens
4*a* . . . Opening
5 . . . Quadrupole Mass Filter Unit
50*a* to 50*d* . . . Rod Electrode
51 . . . Rod Holder
52 . . . Holder Sustaining Stand
52*a* . . . Concave Portion
53 . . . Fixation Band
531 . . . Main Member
532 . . . Coating Film Layer
54*a*, 54*b* . . . Short Spring
55 . . . Heat Release Layer
56, 59 . . . Screw
57 . . . Container
57*a* . . . Inlet Opening
57*b* . . . Outlet Opening
58 . . . Fixation Member
58*a* . . . Concave Portion
6 . . . Outlet Lens
6*a* . . . Opening
7 . . . Ion Detector
10 . . . Coating Film Layer
C . . . Central Axis (Ion Optical Axis)

The invention claimed is:

1. A mass spectrometer comprising:

a) an ion optical element including a plurality of rod electrodes arranged around a linear axis and a rod holder made from an insulating material and configured to hold the plurality of rod electrodes, the ion optical element being configured to separate ions introduced into a space surrounded by the plurality of rod electrodes according to a mass-to-charge ratio using an electric field formed by a radio frequency voltage applied to the plurality of rod electrodes; and b) a boundary member configured to define a region in which the ion optical element is arranged, wherein at least part of a surface of the boundary member, the surface facing the ion optical element, is subjected to an emissivity improvement processing;

the emissivity improvement processing is a surface treatment on the surface of a material from which the boundary member is made.

2. The mass spectrometer according to claim 1, wherein:

at least part of the boundary member is a vacuum housing; and the surface that is subjected to the surface treatment is an inner wall surface of the vacuum housing.

3. The mass spectrometer according to claim 1, wherein:

at least part of the boundary member is a lens, the surface that is subjected to the emissivity improvement processing is a surface of the lens, the surface facing the ion optical element, and the lens is arranged on an upstream side of an ion current to the ion optical element and configured to converge ions and introduce the ions into the space of the ion optical element or the lens is arranged on a downstream side of the ion current from the ion optical element and configured to converge ions and send the ions to a part behind the ion optical element.

4. The mass spectrometer according to claim 1, wherein the surface treatment is a coating film forming processing of forming a thin coating film on the surface of the material from which the boundary member is made.

5. The mass spectrometer according to claim 1, wherein the surface treatment is a processing of roughening the surface of the material from which the boundary member is made by chemically or physically shaving the surface.

6. The mass spectrometer according to claim 4, wherein the boundary member is made from aluminum, and the surface treatment is an anodizing processing.

7. The mass spectrometer according to claim 6, wherein the anodizing processing is a black anodizing processing.

8. The mass spectrometer according to claim 4, wherein the surface treatment is a nickel plating processing.

9. The mass spectrometer according to claim 8, wherein the nickel plating processing is a black nickel plating processing.

10. The mass spectrometer according to claim 4, wherein the surface treatment is a carbon coating film forming processing.

11. The mass spectrometer according to claim 4, wherein the surface treatment is a ceramic spraying processing.

12. The mass spectrometer according to claim 1, wherein the surface treatment is a thin plate or a thin foil made from another material to the surface of the boundary member and applied to the surface.

13. The mass spectrometer according to claim 1, wherein the ion optical element is a quadrupole mass filter.

14. The mass spectrometer according to claim 1, wherein the ion optical element is a linear ion trap.

* * * * *